(12) United States Patent
Nishikawa

(10) Patent No.: US 10,075,621 B2
(45) Date of Patent: Sep. 11, 2018

(54) PRINT DATA GENERATING APPARATUS AND PRINT DATA GENERATING METHOD

(71) Applicant: CANON KABUSHIKI KAISHA, Tokyo (JP)

(72) Inventor: Hiromitsu Nishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/524,833

(22) PCT Filed: Dec. 1, 2015

(86) PCT No.: PCT/JP2015/005976
§ 371 (c)(1),
(2) Date: May 5, 2017

(87) PCT Pub. No.: WO2016/098297
PCT Pub. Date: Jun. 23, 2016

(65) Prior Publication Data
US 2017/0339318 A1    Nov. 23, 2017

(30) Foreign Application Priority Data

Dec. 18, 2014  (JP) .................................. 2014-256080

(51) Int. Cl.
*H04N 1/56* (2006.01)
*H04N 1/60* (2006.01)
(Continued)

(52) U.S. Cl.
CPC ............ *H04N 1/6086* (2013.01); *B33Y 50/02* (2014.12); *G06T 15/506* (2013.01);
(Continued)

(58) Field of Classification Search
None
See application file for complete search history.

(56) References Cited

U.S. PATENT DOCUMENTS

| 2009/0006051 A1* | 1/2009 | Zhou | G06T 15/506 703/5 |
| 2009/0213120 A1* | 8/2009 | Nisper | G01J 3/504 345/426 |

(Continued)

FOREIGN PATENT DOCUMENTS

| JP | 2003-145733 A | 5/2003 |
| JP | 2012-044421 A | 3/2012 |

OTHER PUBLICATIONS

Yanxiang Lan, et al., "Bi-Scale Appearance Fabrication", ACM Transactions on Graphics (TOG)—SIGGRAPH 2013 Conference Proceedings TOG Homepage archive, vol. 32, No. 4, Issue 4, Jul. 2013, pp. 1-11.

(Continued)

*Primary Examiner* — Madelein T Nguyen
(74) *Attorney, Agent, or Firm* — Carter, DeLuca, Farrell & Schmidt, LLP

(57) ABSTRACT

A print data generating apparatus obtains a BRDF model group for each of a plurality of colors and the angle of incident light in the environment where an object to be reproduced is to be viewed. The print data generating apparatus then applies the angle of the incident light thus obtained to each of the models in the BRDF model group to thereby calculate the reflection distribution of the object to be reproduced for which the angle of the incident light is limited. The print data generating apparatus then outputs color data and form data for each of the models in the BRDF model group based on the reflection distribution, the color data indicating a color to be formed on the surface of the object to be reproduced, the form data indicating the form of the object to be reproduced.

15 Claims, 11 Drawing Sheets

(51) Int. Cl.
  *H04N 1/00* (2006.01)
  *G06T 15/50* (2011.01)
  *B33Y 50/02* (2015.01)
  *G05B 19/4097* (2006.01)

(52) U.S. Cl.
  CPC ..... *H04N 1/00827* (2013.01); *G05B 19/4097* (2013.01); *G05B 2219/45187* (2013.01)

(56) References Cited

U.S. PATENT DOCUMENTS

| | | | |
|---|---|---|---|
| 2010/0134811 | A1 | 6/2010 | Fukasawa et al. |
| 2012/0032973 | A1 | 2/2012 | Sano |
| 2014/0340707 | A1* | 11/2014 | Hirabayashi ........... G01N 21/57 |
| | | | 358/1.15 |
| 2015/0016711 | A1* | 1/2015 | Tin ........................ G06T 7/0004 |
| | | | 382/152 |
| 2015/0172636 | A1* | 6/2015 | Gordon ................ H04N 5/2354 |
| | | | 348/46 |
| 2015/0379162 | A1* | 12/2015 | MohammadBagher ..................... |
| | | | G06F 17/50 |
| | | | 703/1 |
| 2016/0371880 | A1* | 12/2016 | Ide ........................ G06T 15/506 |
| 2017/0011496 | A1* | 1/2017 | Lu ........................... G06T 15/50 |
| 2017/0104894 | A1 | 4/2017 | Nishikawa |

OTHER PUBLICATIONS

Notification of Transmittal of the International Search Report and the Written Opinion of the International Search Authority, or the Declaration issued in corresponding application No. PCT/JP2015/005976 on Feb. 16, 2016.

* cited by examiner

| | 401 | 402 $\rho_d$ | | | 403 $\rho_s$ | | | 404 $\alpha_x$ | | | 405 $\alpha_y$ | | |
|---|---|---|---|---|---|---|---|---|---|---|---|---|---|
| R G B | | r | g | b | r | g | b | r | g | b | r | g | b |
| 0, 0, 0 | | 0.05, 0.06, 0.07 | | | 9.10, 9.20, 8.09 | | | 1.00, 0.96, 0.98 | | | 0.53, 0.54, 0.52 | | |
| 0, 0, 32 | | 0.10, 0.12, 0.13 | | | 7.70, 8.10, 7.92 | | | 1.34, 1.11, 1.29 | | | 0.64, 0.72, 0.68 | | |
| ⋮ | | ⋮ | | | ⋮ | | | ⋮ | | | ⋮ | | |

FIG.4

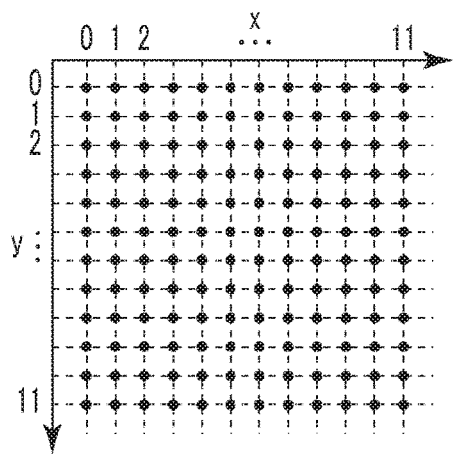
FIG.7A
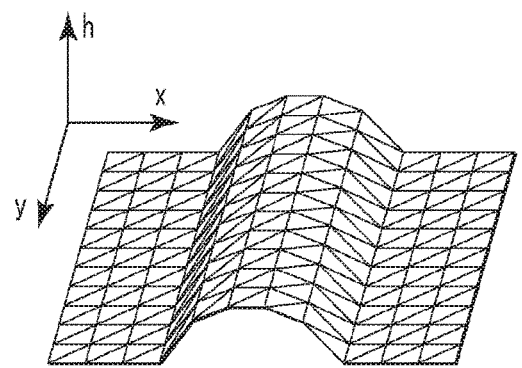
FIG.7B
| | | 701 | | | 702 | |
|---|---|---|---|---|---|---|
| | | | | | h(m,n) | |
| Xratio | Yratio | (0,0) | (0,1) | (0,2) | ... | (11,11) |
| 1.0, | 1.0 | 0, | 0, | 0, | ... | 0. |
| 1.2, | 1.0 | 0, | 0, | 0, | ... | 0. |
| : | | : | | | | : |
FIG.7C
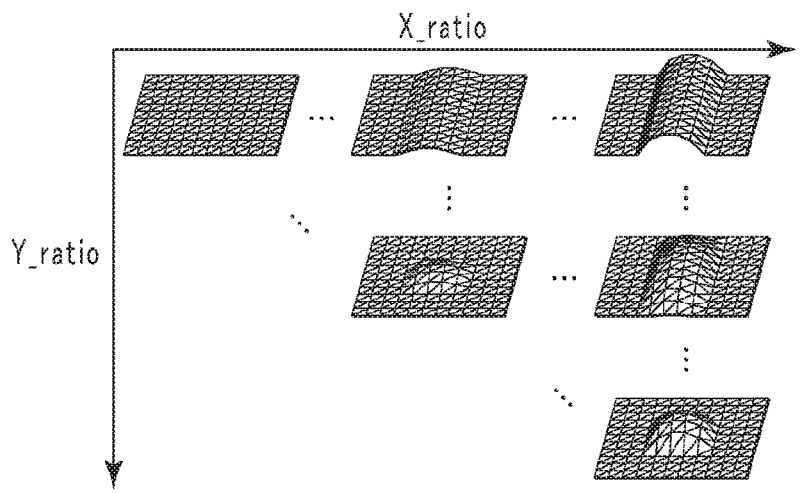
FIG.7D

PRINT DATA GENERATING APPARATUS AND PRINT DATA GENERATING METHOD

TECHNICAL FIELD

The present invention relates to a print data generating process for printing that has a characteristic feature in surface scattering.

BACKGROUND ART

In recent years, techniques for controlling the surface scattering of printed images have been developed, and there has been a trend of using digital techniques to reproduce a print object with an elaborate design by matching colors and reflective properties with those of the inputted original. PTL 1 describes the following. Specifically, a method is described in which: from a subject placed and illuminated on a planar base, diffuse reflection image signals and gloss signals, which indicate the degree of gloss, are obtained desirably in two directions, namely, a main-scanning direction and a sub-scanning direction; and after the diffuse reflection image signals are outputted with color inks, a shape is formed with a transparent ink to reproduce the gloss of the gloss signals in the two directions.

Also, according to a technique described in NPL 1, it is possible to reproduce anisotropic reflection in which, like satin or the like, the intensity of gloss and the shading change with changes in the incident direction of light and the viewing direction. Note that, in the print reproduction in NPL 1, a three-dimensional printer is used, and concavities and convexities are provided on the surface to allow surface scattering to change depending on the incident angle and the viewing angle.

CITATION LIST

Patent Literature

PTL 1: Japanese Patent Laid-Open No. 2003-145733

Non Patent Literature

NPL 1: Yanxiang Lan, Yue Dong, Fabio Pellacini, Xin Tong, "Bi-Scale Appearance Fabrication", ACM Transactions on Graphics (TOG)—SIGGRAPH 2013 Conference Proceedings TOG Homepage archive, Volume 32 Issue 4, July 2013

SUMMARY OF INVENTION

Technical Problem

In the technique described in PTL 1, the process is divided into reproduction of the diffused colors via control of the color inks and reproduction of the gloss via control of the transparent ink. In addition, the gloss is reproduced based only on the intensities in the two directions. Such a technique cannot sufficiently reproduce the object's actual appearance. On the other hand, in the technique described in NPL 1, the object's bidirectional reflectance distribution function (BRDF) is obtained and changes in surface scattering depending on the viewing angle are expressed with a print object having a three-dimensional structure. This three-dimensional structure can be obtained from the bidirectional reflectance distribution function (BRDF). Meanwhile, the bidirectional reflectance distribution function (BRDF) is the distribution of reflected light of light incident from a given direction. The surface reflection property (refractive index) and shape of the reproduction target material must be reproduced on the object to be reproduced with high fidelity in order that the properties of reflected light are matched on the object to be reproduced. However, this high-fidelity reproduction is actually impossible in a case of using a printer with a limited number of color materials. In NPL 1, optimization is used in an attempt to match the surface scattering in any light source direction and any viewing direction between the reproduction target material and the print object. Doing so, however, involves a great number of dimensions to be calculated and is in fact trying to solve a problem that is actually impossible to solve.

Solution to Problem

A print data generating apparatus according to the present invention includes: an obtaining unit configured to obtain a BRDF model group for each of a plurality of colors and an angle of incident light in an environment where a n object to be reproduced is to be viewed; a calculating unit configured to calculate a reflection distribution of the object to be reproduced for which the angle of the incident light is limited by applying the angle of the incident light, obtained by the obtaining unit, to each of models in the BRDF model group; a color data outputting unit configured to output color data for each of the models in the BRDF model group based on the reflection distribution calculated by the calculating unit, the color data indicating a color to be formed on a surface of the object to be reproduced; and a form data outputting unit configured to output form data for each of the models in the BRDF model group based on the reflection distribution calculated by the calculating unit, the form data indicating a form of the object to be reproduced.

Advantageous Effects of Invention

The present invention greatly reduces the number of dimensions to be calculated for reproducing an object's surface scattering such as anisotropic reflection and is therefore capable of highly accurate reproduction in a simpler manner.

Further features of the present invention will become apparent from the following description of exemplary embodiments (with reference to the attached drawings).

BRIEF DESCRIPTION OF DRAWINGS

FIG. 4 is a diagram showing one example of a color conversion LUT in the embodiment;

FIG. 7A is a diagram for describing one example of a form data LUT in the embodiment;

FIG. 7B is a diagram for describing one example of a form data LUT in the embodiment;

FIG. 7C is a diagram for describing one example of a form data LUT in the embodiment;

FIG. 7D is a diagram for describing one example of a form data LUT in the embodiment;

DESCRIPTION OF EMBODIMENTS

Figure 1:
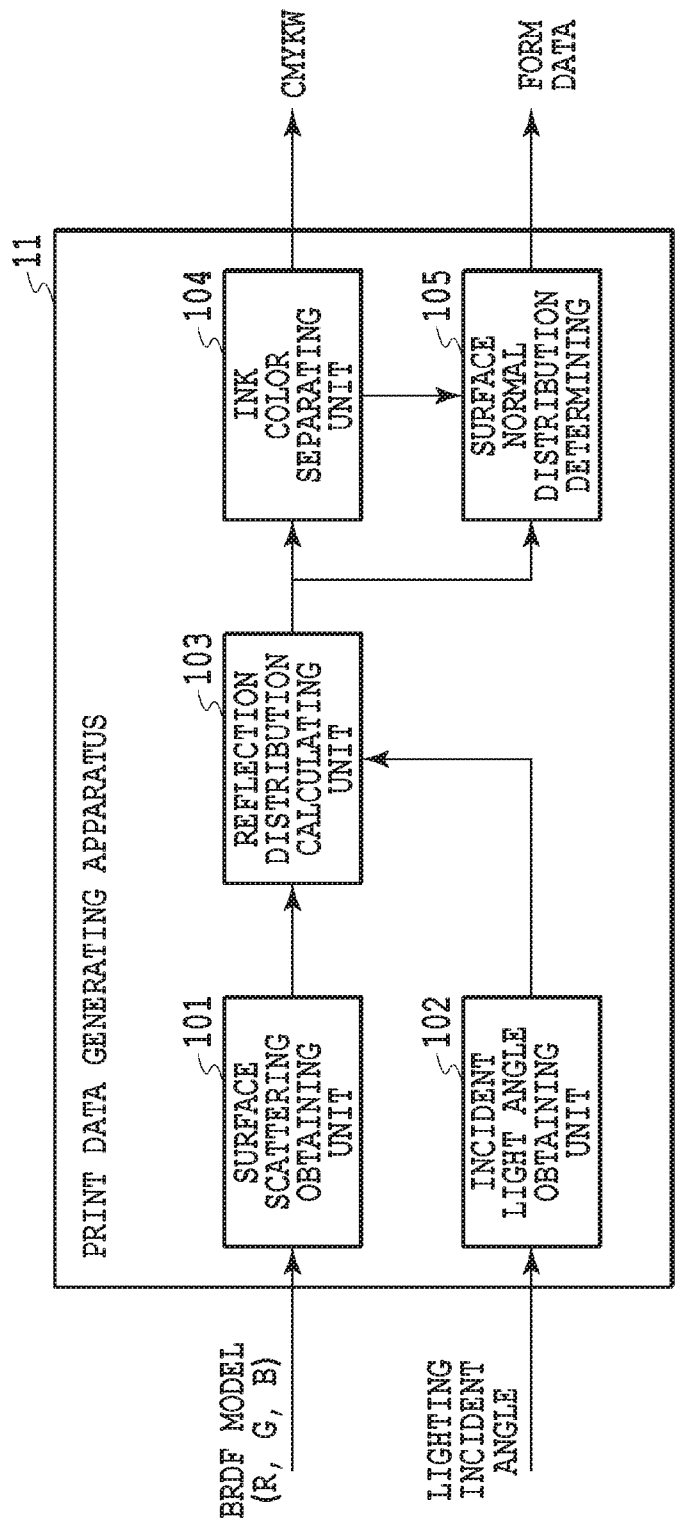
FIG. 1 is a diagram showing one example of the configuration of a print data generating apparatus in an embodiment.

Embodiments of the present invention will be described hereunder with reference to the drawings. Note that the following embodiments are not intended to limit the present invention and that not all the combinations of the features described in these embodiments are necessarily essential for the solving means of the present invention. Also, identical constituent components will be described with the same reference numeral given thereto.

Embodiment 1

<Configuration of Print Data Generating Apparatus and Generating Steps>

FIG. 1 is a block diagram showing the configuration of a print data generating apparatus in this embodiment. A print data generating apparatus 11 includes a surface scattering obtaining unit 101, an incident light angle obtaining unit 102, a reflection distribution calculating unit 103, an ink color separating unit 104, and a surface normal distribution determining unit 105. The print data generating apparatus functions as each function unit shown in FIG. 1 by causing a CPU to execute a print data generating program, which is stored in a ROM, a HDD, or the like not shown, by using a RAM as a work memory.

The surface scattering obtaining unit 101 is configured to obtain, from outside, a bidirectional reflectance distribution function (BRDF) model group representing BRDF models of the pixels of print data, for example, for each of red (R), green (G), and blue (B) signals. Each BRDF model here includes various known models such as the Lambertian model, Cook and Torrance model, and Ward model. In this embodiment, an example where the Ward model is used will be described later for the sake of explanation, but this embodiment is not intended to limit the BRDF model to be used and any of those BRDF models may be used.

The incident light angle obtaining unit 102 is configured to obtain the incident angle of lighting in the environment where the print object using the print data to be generated is to be viewed. Assume a situation where the print object is exhibited in a gallery or a museum, for example. In this case, the exhibitor side can set the incident angle of the lighting on the print object. With the incident angle of the lighting on the print object being already known as above, the number of dimensions to be calculated based on the BRDF model is reduced.

The reflection distribution calculating unit 103 is configured to calculate a reflection distribution for each of the R, G, and B signals at the incident angle of the light obtained by the incident light angle obtaining unit 102, by using data corresponding to the BRDF model of each of the R, G, and B signals obtained by the surface scattering obtaining unit 101, for example.

The ink color separating unit 104 is configured to perform color separation into the combination of the ink colors which the printer is equipped with, from the R, G, and B reflectance distributions calculated by the reflection distribution calculating unit 103. The ink color separating unit 104 performs a process in which R, G, and B signals are derived from the R, G, and B reflectance distributions and the derived R, G, and B signals are converted into C, M, Y, K, and W signals, for example.

The surface normal distribution determining unit 105 is configured to calculate a surface normal distribution of the print object from the reflection distributions of the R, G, and B signals calculated by the reflection distribution calculating unit 103 and reflectance distributions based on the result of the ink color separation by the ink color separating unit 104.

(BRDF Model)

One example of a BRDF model corresponding to each single pixel of surface scattering data (BRDF model group) obtained by the surface scattering obtaining unit 101 will now be described. As mentioned earlier, in this embodiment, the anisotropic Ward model shown by the following formulas is used as the BRDF model for the sake of explanation.

$$I_{brdf}(\vec{l}, \vec{v}) = \frac{\rho_d}{\pi} - f_{spe}(\vec{l}, \vec{v}) \quad \text{Formula (1)}$$

$$f_{spe}(\vec{l}, \vec{v}) = \frac{\rho_s}{4\pi \alpha_x \alpha_y \sqrt{\cos\theta_l \cos\theta_v}} \exp\left\{-\tan^2\theta_h \left(\frac{\cos^2\phi_h}{\alpha_x^2} + \frac{\sin^2\phi_h}{\alpha_y^2}\right)\right\} \quad \text{Formula (2)}$$

Here, $\vec{l}$ is a light source vector representing the direction of a light source, and $\vec{v}$ is an observing vector representing the direction of eyes. $\vec{h}$ is a half vector of the light source vector $\vec{l}$ and the observing vector $\vec{v}$.

$\theta_l$ is the angle between a normal vector to the pixel and the light source vector, $\theta_v$ is the angle between the normal vector to the pixel and the observing vector, and $\theta_h$ is the angle between the normal vector to the pixel and the half vector. Moreover, $\phi_h$ is the angle between the half vector and a tangent vector (x axis) to the pixel. $\rho_d$ is a diffuse component meaning the intensity of the diffuse reflection, $\rho_s$ is a specular intensity component meaning the intensity of the specular reflection, $\alpha_x$ is a specular spread component representing the spread of the specular reflection in the tangent vector direction, and $\alpha_y$ is a specular spread component representing the spread of the specular reflection in the vertical normal vector direction. The optical anisotropy is expressed by describing the specular spread component in two dimensions with the tangent vector direction (x axis) and the vertical normal vector direction (y axis).

In this embodiment, the four parameters mentioned above are given for each of three pieces of color information R, G, and B. Note that in this embodiment, the pieces of color information will be described as three, R, G, and B pieces of information, but the method is not limited to such a case. For example, by using the spectral reflectance, color reproduction independent of the spectral luminance of the incident light and the like are possible. In addition, the tangent vector (x axis) can be defined in such that the direction differs from one pixel to another, and a rotation angle φ between the tangent vector to the pixel and the horizontal axis of the plane of the two-dimensional image is given for each pixel. As mentioned above, in this embodiment, a BRDF model based on an anisotropic Ward model is used. In so doing, 13 pieces of information in total (4 parameters ($\rho_d$, $\rho_s$, $\alpha_x$, $\alpha_y$)×3 colors (R, G, B)+1 (rotation angle)) are given for the pixel of each BRDF model. Note that these pieces of information are inputted into the print data generating apparatus as surface scattering data in the form of two-dimensional image information in which the above 13 dimensions in floating point are synchronized. The surface scattering obtaining unit 101 obtains the surface scattering data thus inputted (the above 13 pieces of information) for each BRDF model in the BRDF model group. Note that it suffices that the positional information on the pixel and the above 13 pieces of information are associated with each other, and the 13 pieces of information may not be obtained in the form of two-dimensional image information.

As shown in Formula (2) above, the bidirectional reflectance distribution function (BRDF) is a function dependent on the incident angle of light (light source vector) and the viewing direction (observing vector). This means that the reflection distribution calculating unit 103 is capable of calculating the reflection distribution required for the print object by using the BRDF models (surface scattering data) obtained by the surface scattering obtaining unit 101 and the light source vector obtained by the incident light angle obtaining unit 102.

In other words, the reflection distribution calculating unit 103 calculates the distribution of light reflected in each eye direction upon incidence of light from one light source vector. In Formula (2) above, the light source vector is already known, and the 13 pieces of information in total (4 parameters ($\rho_d$, $\rho_s$, $\alpha_x$, $\alpha_y$)×3 colors (R, G, B)+1 (rotation angle)) have been inputted and are thus already known. Therefore, the reflection distribution calculating unit 103 calculates the reflection intensity for all the observing vectors and outputs it as a reflection distribution. Note that the reflection distribution includes the diffuse component $\rho_d$, the specular intensity component $\rho_s$, and the specular spread components $\alpha_x$ and $\alpha_y$.

(Division of BRDF Model into Pixels for Printing)

Figure 2:
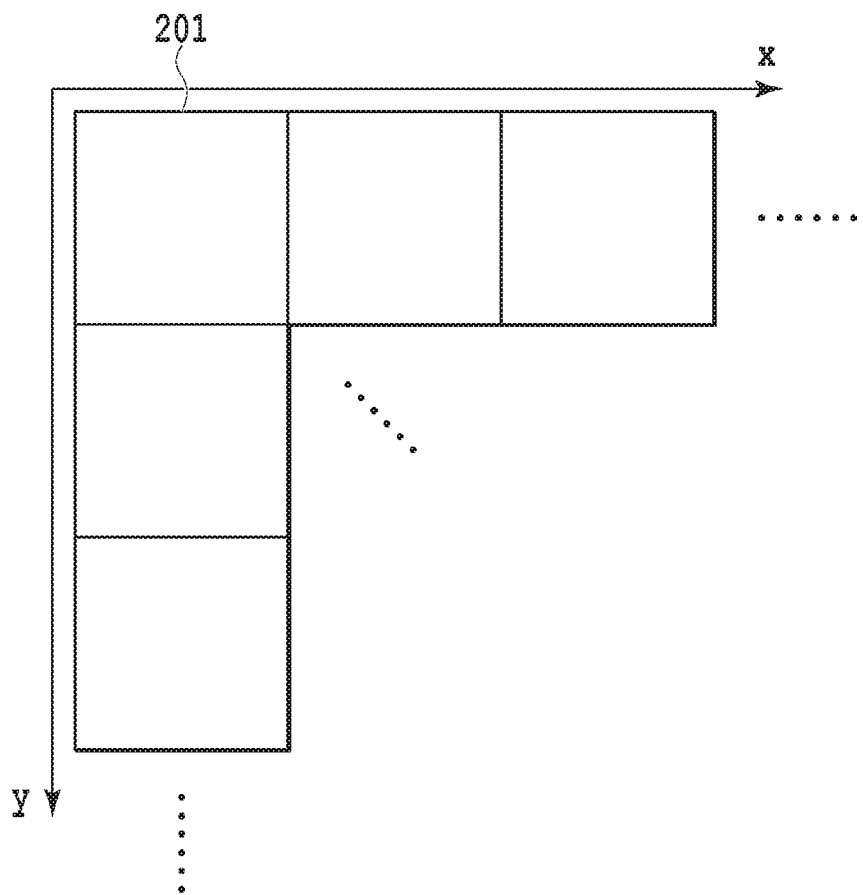
FIG. 2 is a diagram showing one example of a BRDF model group in the embodiment.

FIG. 2 is a diagram showing a state where a plurality of pieces of data of the models (pixels) in the BRDF model group are arranged side by side in a horizontal (x) direction and a vertical (y) direction. In this embodiment, a process performed in response to input of a pixel 201 of one of the BRDF models will be described. However, by sequentially processing the pixels of the BRDF models arranged side by side in the x and y directions, print data of any size can be processed. Also, this process is not dependent on the processing sequence and the process may therefore be performed in any sequence as long as all the pixels of the BRDF models arranged side by side in the x and y directions can be processed. One square in FIG. 2 corresponds to the pixel of one BRDF model, and the surface scattering data, which is the 13 pieces of information in total (4 parameters ($\rho_d$, $\rho_s$, $\alpha_x$, $\alpha_y$)×3 colors (R, G, B)+1 (rotation angle)), is inputted for the pixel of each single BRDF model.

Figure 3:
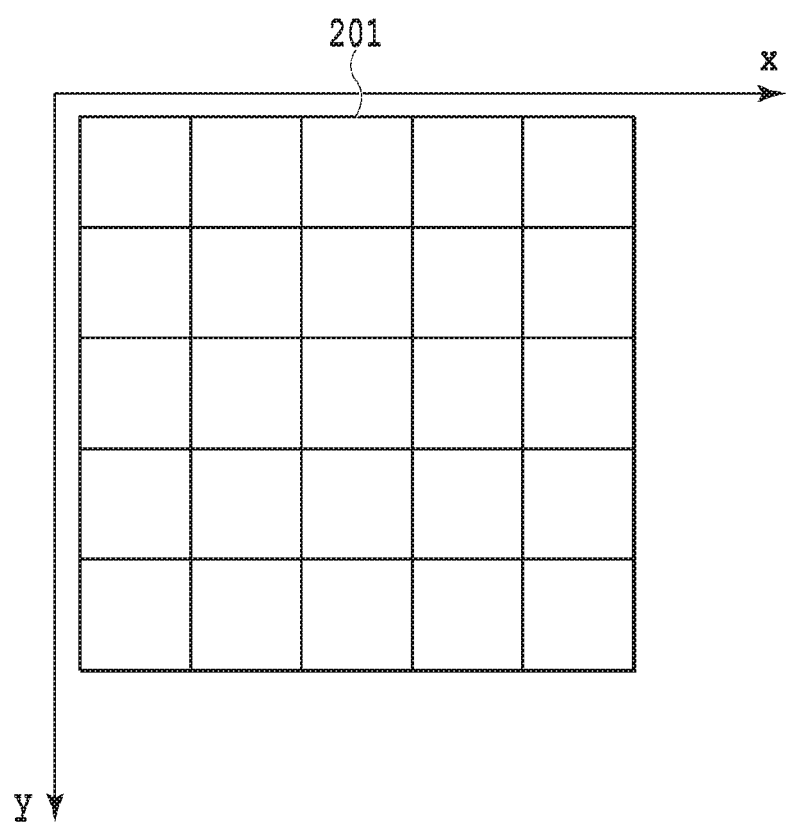
FIG. 3 is a diagram showing one example of division of a BRDF model into print data in the embodiment.

FIG. 3 shows an example where the pixel 201 of one BRDF model is divided into pixels for printing. As shown in the figure, in the print data generating apparatus of this embodiment, the pixel 201 of one inputted BRDF model is divided into 6×6 pixels of the printer, for example. Note that this embodiment is not limited to this division number and can use any suitable division number such for example as 4×4 pixels, 8×8 pixels, or 8×6 pixels. In so doing, setting a smaller division number allows a closer relation to the resolution of the printer and therefore brings about advantages such as a higher BRDF reproduction resolution.

(Ink Color Separating Unit)

The process by the ink color separating unit 104 will now be described in detail. For each pixel, the ink color separating unit 104 derives color data (color material control amounts) from the parameter $\rho_d$ representing the diffuse component and the parameter $\rho_s$ representing the specular intensity component, which are inputted thereto. The ink color separating unit 104 then derives ink amount data from the derived color material control amounts. The parameter $\rho_d$ representing the diffuse component and the parameter $\rho_s$ representing the specular intensity component, which are inputted into the ink color separating unit 104, are the values calculated by the reflection distribution calculating unit 103 in accordance with the incident light angle. Moreover, the ink color separating unit 104 derives specular spread components corresponding to the color material control amounts and outputs them into the surface normal distribution determining unit 105.

In this embodiment, the ink color separation process is performed by referring to a color material look-up table (color table) in which $\rho_d$ representing the diffuse component and the specular intensity component $\rho_s$ are stored for each of R, G, and B. FIG. 4 describes this color material look-up table. As shown in FIG. 4, in this look-up table, the values of the four parameters ($\rho_d$, $\rho_s$, $\alpha_x$, $\alpha_y$) are recorded for each color in rows 402 to 405, respectively, the values of the four parameters corresponding to the values of the R, G, and B signals shown in a column 401. Note that this color material look-up table can be generated by measuring, by means of a publicly-known measuring method such as using a goniophotometer, an image formed by generating patch image data containing the color values in the column 401, and inputting it into a print data outputting apparatus not shown in particular. Also, the configuration is desirably such that the calculation is done by taking into consideration the light source vector inputted like the data inputted into the ink color separating unit 104.

Figure 5:
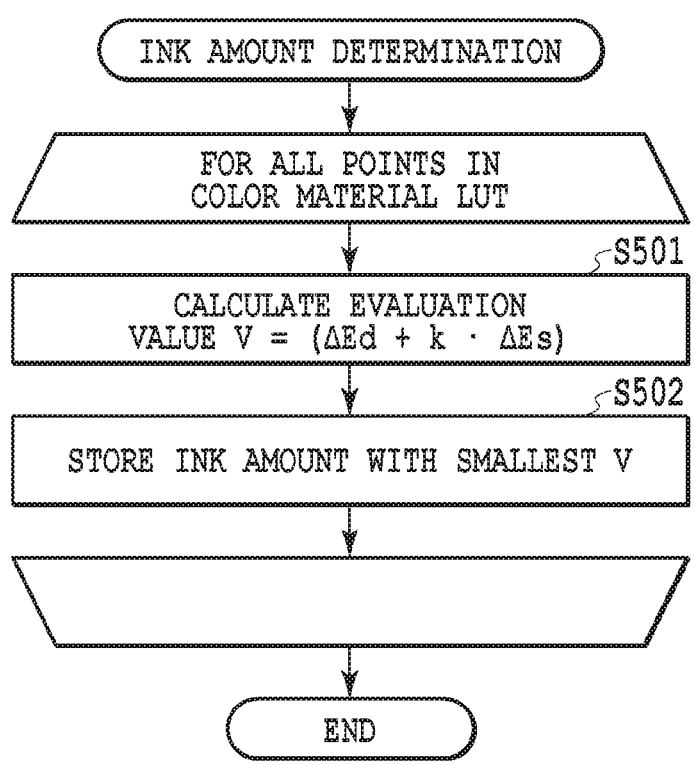
FIG. 5 is a diagram showing the flow of ink amount determination in the embodiment.

FIG. 5 is a flowchart describing the flow of the process by the ink color separating unit 104. In this embodiment, among all the rows in the look-up table described with reference to FIG. 4, the R, G, and B values in the column 401 of the color material with the smallest distances between the inputted diffuse component $\rho_d$ and $\rho_d$ in the column 402 in the color material look-up table and between the inputted specular intensity component $\rho_s$ and $\rho_s$ in the column 403 in the color material look-up table are set as the color material control amounts. More specifically, in Step S501, the ink color separating unit 104 calculates an evaluation value V for the distances between $\rho_d$ and between $\rho_s$ from the following formulas.

$$V = \Delta Ed + k \cdot \Delta Es \qquad \text{Formula (3)}$$

$$\Delta Ed = \sqrt{\begin{array}{l}(\rho d_{LUT}\_r[m] - \rho_d\_r)^2 + \\ (\rho d_{LUT}\_g[m] - \rho_d\_g)^2 + (\rho d_{LUT}\_b[m] - \rho_d\_b)^2\end{array}} \qquad \text{Formula (4)}$$

$$\Delta Es = \sqrt{\begin{array}{l}(\rho s_{LUT}\_r[m] - \rho_s\_r)^2 + \\ (\rho d_{LUT}\_g[m] - \rho_s\_g)^2 + (\rho d_{LUT}\_b[m] - \rho_s\_b)^2\end{array}} \qquad \text{Formula (5)}$$

Here, k is a constant, $\rho_{d\_}r$, $\rho_{d\_}g$, and $\rho_{d\_}b$ are the information of the inputted diffuse components $\rho_d$ of the colors (R, G, and B), and $\rho_{s\_}r$, $\rho_{s\_}g$, and $\rho_{s\_}b$ are the information of the inputted specular intensity components $\rho_s$ of the colors (R, G, and B). Also, $\rho d_{LUT\_}r[m]$, $\rho d_{LUT\_}g[m]$, and $\rho d_{LUT\_}b[m]$ represent the values of r, g, and b in the column 402 at the m-th row and $\rho s_{LUT\_}r[m]$, $\rho s_{LUT\_}g[m]$, and $\rho s_{LUT\_}b[m]$ represent the values of r, g, and b in the column 403 at the m-th row.

Then in Step S502, the ink color separating unit 104 determines whether or not the evaluation value V is the smallest. If so, the ink color separating unit 104 records the values of R, G, and B in the column 401 at the m-th row and the values of $\alpha_x$ and $\alpha_y$ in the columns 404 and 405 at the m-th row. The processes in Steps S501 and S502 are performed for all the points in the color material look-up table (all the columns in FIG. 4) by changing the value of m. In doing so, the values of R, G, and B with the smallest evaluation value V can be determined as the color material control amounts for the pixel (the 6×6 pixels of the printer). Moreover, the ink color separating unit 104 outputs the values of specular spread components $\alpha'_x$ and $\alpha'_y$ of the color materials on the surface corresponding to the determined color material control amounts to the surface normal distribution determining unit 105. These values of the specular spread components $\alpha'_x$ and $\alpha'_y$ of the color materials on the surface corresponding to the determined color material control amounts are the values stored in the columns 404 and 405 in the color material look-up table and recorded in Step S502.

The color material control amounts thus derived are converted by means of a publicly-known color matching process into a plurality of pieces of ink amount data for C, M, Y, K, and W, which indicate ink amounts, and then outputted. Note that the method of determining the ink amounts is not limited to the above method, and various other known color matching algorisms are applicable.

(Determination of Surface Normal Distribution)

The surface normal distribution determining unit 105 processes the pixels of the BRDF models one by one. The surface normal distribution determining unit 105 obtains ax and $\alpha_y$, which are the specular spread components calculated by the reflection distribution calculating unit 103 and the rotation angle φ of the processing-target BRDF model, as well as the specular spread components $\alpha'_x$ and $\alpha'_y$ of the color materials on the surface inputted from the ink color separating unit 104. As the rotation angle φ, the value contained in the surface scattering data obtained by the surface scattering obtaining unit 101 can be used. The surface normal distribution determining unit 105 may obtain the rotation angle φ through the reflection distribution calculating unit 103 or from the surface scattering obtaining unit 101. Based on these pieces of information thus obtained, the surface normal distribution determining unit 105 outputs form data which is 6×6 height information. That is, the surface normal distribution determining unit 105 outputs form data representing 6×6 height information for the pixel of one BRDF model. With this 6×6 height information, a 5×5 inclined surface can be formed in reproduction of the pixel of one BRDF model.

Figure 6:
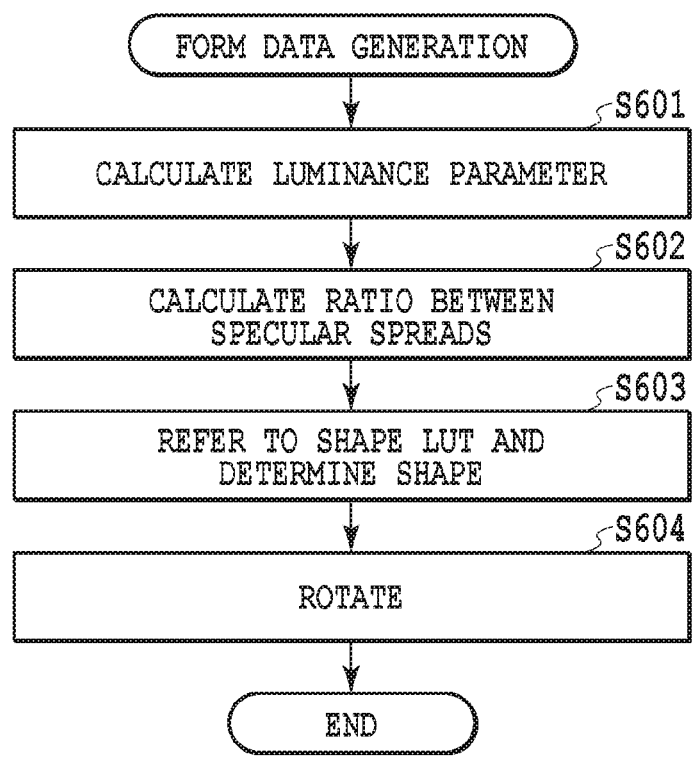
FIG. 6 is a diagram showing the flow of form data generation in the embodiment.

FIG. 6 is a flowchart showing the operation of the surface normal distribution determining unit 105. In this embodiment, as each of the specular spread components $\alpha_x$ and $\alpha_y$, information corresponding to the three colors R, G, and B is inputted.

First in Step S601, the surface normal distribution determining unit 105 calculates specular spread components with respect to luminance. Specifically, various methods are available such as calculating a weighted average of the R, G, and B specular spread components for each parameter. In the following, the weighted average values will be described as $\alpha l_x$, $\alpha l_y$, $\alpha l'_x$, and $\alpha l'_y$, respectively. $\alpha l_x$ and $\alpha l_y$ represent specular spread components with respect to luminance calculated by respectively obtaining the weighted averages of the specular spread components in the x direction and the y direction inputted from the reflection distribution-calculating unit 103. $\alpha l'_x$ and $\alpha l'_y$ represent specular spread components with respect to luminance calculated by respectively obtaining the weight averages of the specular spread components in the x direction and the y direction inputted from the ink color separating unit 104.

Then in Step S602, using Formula (6) below, the surface normal distribution determining unit 105 calculates the ratio between the two specular spread components in the x direction with respect to luminance which are calculated in Step S601 from the inputs from the reflection distribution calculating unit 103 and the ink color separating unit 104. Also, using Formula (7) below, the surface normal distribution determining unit 105 calculates the ratio between the two specular spread components in the y direction with respect to luminance which are calculated in Step S601 from the inputs from the reflection distribution calculating unit 103 and the ink color separating unit 104.

$$Xratio=\alpha l_x/\alpha l'_x \quad \text{Formula (6)}$$

$$Yratio=\alpha l_y/\alpha l'_y \quad \text{Formula (7)}$$

In Step S603, the surface normal distribution determining unit 105 determines a base form by referring to a form look-up table (form table) with the specular spread ratios Xratio and Yratio calculated in Step S602. In the calculation of the surface normal distribution, it is desirable to reproduce the inputted BRDF model with as high fidelity as possible. Generally, in a state where color materials are placed on the upper surface, the intensity of specular reflection on a single surface (⅕×5) may be reduced in some cases. For this reason, in this embodiment, a process is performed in which the specular spread ratio utilizing the reflection properties in the state where the color materials are placed, i.e. after the color separation, is obtained, and a form corresponding to this ratio is determined.

FIGS. 7A to 7D are diagrams describing the form look-up table. In this embodiment, 6×6 height information is calculated for the pixel of each single inputted BRDF model. The form look-up table thus has a plurality of pieces of base form information (form models) in each of which height information is recorded for each of lattice points with a size of 6×6 or larger. FIG. 7A is a diagram describing the lattice points of a piece of base form information, and FIG. 7B is a diagram showing an example of the three-dimensional form of a piece of base form information. As shown in FIG. 7A, in this embodiment, height information is given for each of 12 points in each of the x direction and in the y direction, i.e. 144 points in total (12×12). With height information given at lattice points of a size larger than 6×6, which is the size of the height information to be outputted, it is possible to calculate the height information within the 6×6 output size range even after a subsequent rotation process S604 is performed. Note that the size of the lattice points are desirably such that the length of one side thereof is at least $\sqrt{2}$ times larger than the length of one side of the size to be outputted (6 in this embodiment).

Each piece of base form information is recorded in the form look-up table shown in FIG. 7C in a column 702 as height information on the 144 points in association with a combination of the Xratio and the Yratio in a column 701. Note that this look-up table only needs to hold height information only for an upper triangular matrix as shown in FIG. 7D since the subsequent rotation process S604 is to be performed. Meanwhile, as shown in FIG. 7D, the larger the Xratio or Yratio becomes, the larger the roughness form becomes. Thus, the larger the Xratio or Yratio becomes, the larger the specular spread is reproduced. Further, on the diagonal where the Xratio and the Yratio are equal, the specular spread should be isotropic, and the height information is therefore desirably set such that the form is the same in the x direction and in the y direction. Furthermore, in a case where the difference between the Xratio and the Yratio is large, strong anisotropy should be reproduced, and the height information is therefore desirably set such that the form differs between the x direction and the y direction.

In Step S604, the surface normal distribution determining unit 105 rotates the form determined in Step S603 by the rotation angle φ and calculates 6×6 height information to be outputted. In Step S604, first, x and y of the 12×12 height information, which is the form determined in Step S603, are rotated by the rotation angle φ about the center coordinates ((x, y)=(10.5, 10.5) in FIG. 7A) to obtain coordinates x' and y'. Then, heights h at the coordinates x and y corresponding to the 6×6 height information to be outputted are calculated from the x'-y'-h space by means of a publicly-known interpolation process. In FIG. 7A, the heights at 6×6 lattice points centered at the center coordinates (x coordinates 3 to 8 and y coordinates 3 to 8) are calculated from the x'-y'-h space, and height information indicating the calculated heights are set as the form information on the pixel of the model to be outputted.

Figure 8A:
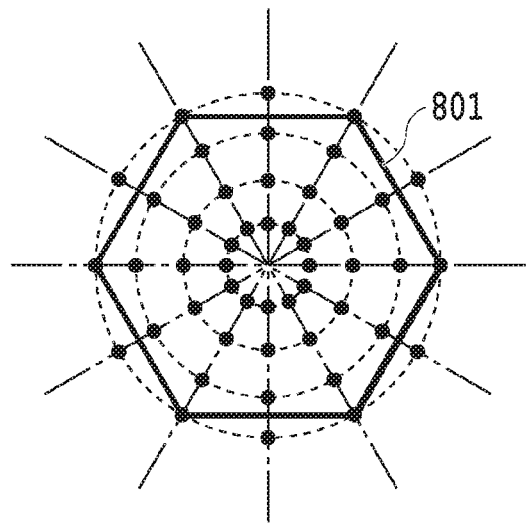
FIG. 8A is a diagram for describing one example of the form of a pixel of a BRDF in the embodiment.
Figure 8B:
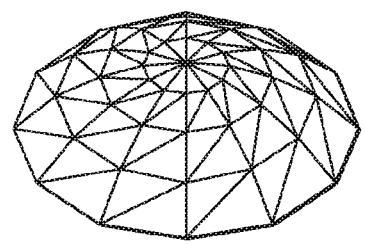
FIG. 8B is a diagram for describing one example of the form of a pixel of a BRDF in the embodiment.

As described above, by using the form look-up table, the optical anisotropy of the input information can be easily reproduced. Note that while the lattice points of the base form are described as a square lattice as shown in FIG. 7A, the lattice points are not limited to such a form. For example, the lattice points can be arranged concentrically about the center coordinates ((x, y)=(10.5, 10.5)). By determining the base form on the concentrically-arranged lattice points, a semispherical form can be formed more accurately. FIG. 8A shows such lattice point arrangement, and FIG. 8B shows an example of the base form thereon.

Figure 8C:
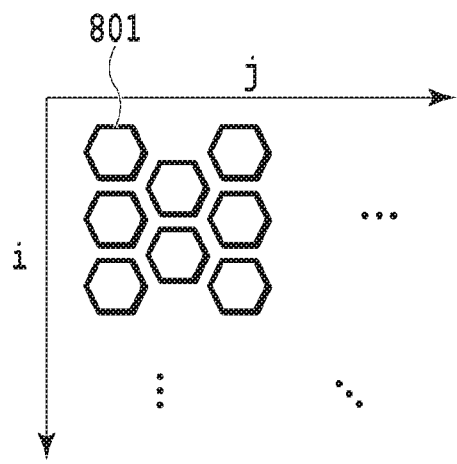
FIG. 8C is a diagram for describing one example of the form of a pixel of a BRDF in the embodiment.

Alternatively, the form of one pixel, which is the unit region for reproducing a BRDF, may be the regular hexagon shown by reference numeral 801 in FIG. 8A. Moreover, by arranging pixels each with the regular hexagonal form shown in FIG. 8A into a honeycomb structure as shown in FIG. 8C, the density of the pixels for reproducing the BRDFs remains unchanged regardless of the direction. In a case where the density of the pixels for reproducing the BRDFs changes depending on the direction, unintended anisotropic reflection may possibly appear on a cluster of BRDFs if a plurality of pixels are macroscopically seen, for example, if the print object is viewed from a certain viewing distance. However, arranging the pixels such that the density remains constant regardless of the direction as described above brings about advantages such as being able to obtain a high quality image without the above problem.

(Overall Process Flow in Print Data Generating Apparatus)

Figure 9:
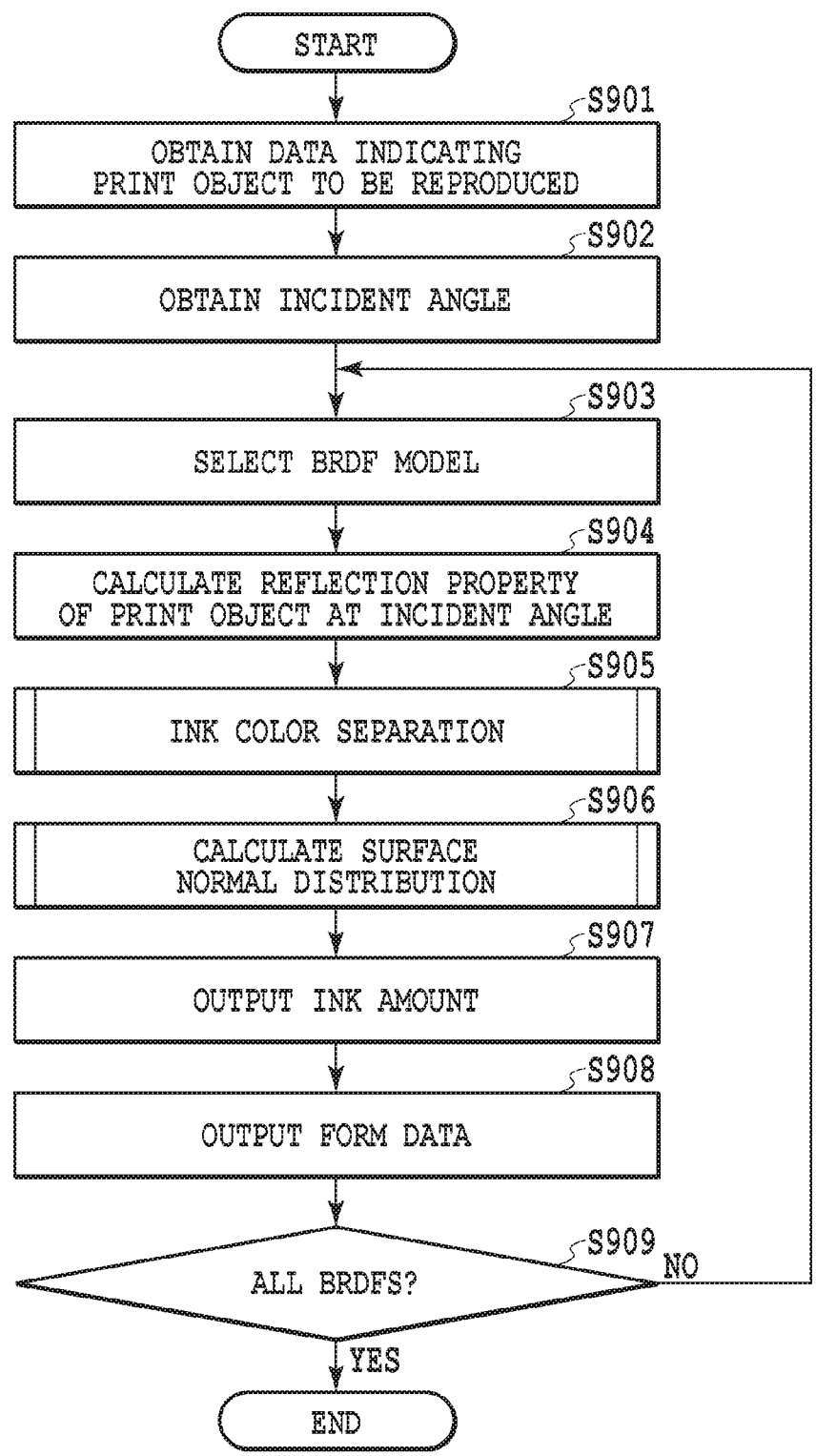
FIG. 9 is a diagram showing the flow of a print data generation process in Embodiment 1.

FIG. 9 is a flowchart showing the flow of the series of operations of each block in the print data generating apparatus 11 shown in FIG. 1. Note that details of the operation of each block are as described above in detail.

First in Step S901, the surface scattering obtaining unit 101 obtains surface scattering data representing a BRDF model group as data indicating a print object to be reproduced. The data indicating a print object to be reproduced here is data in which pixels of BRDF models are arranged side by side in the x and y directions like the one shown in FIG. 2 mentioned earlier, for example.

Then in Step S902, the incident light angle obtaining unit 102 obtains a light source vector (incident angle) for viewing the print object which is to be printed using data to be generated by the print data generating apparatus 11.

In Step S903, the print data generating apparatus 11 selects the pixel of one model among the BRDF model group obtained in Step S901. Subsequent Steps S904 to S908 are processes for the pixel of this one selected BRDF model.

In Step S904, the reflection distribution calculating unit 103 calculates a target reflectance distribution for the print object by applying the light source vector obtained in Step S902 to the BRDF model of the pixel selected in Step S903.

In Step S905, the ink color separating unit 104 performs ink color separation. Details of the process are done as described earlier by following the flow shown in FIG. 5.

In Step S906, the surface normal distribution determining unit 105 calculates a surface normal distribution in conformity with the target reflectance distribution calculated in Step S904. Details of the process are done as described earlier by following the flow shown in FIG. 6.

In Step S907, the ink color separating unit 104 performs a color data outputting process for outputting data outputted in Step S905 and indicating, for example, C, M, Y, K, and W ink amounts.

In Step S908, the surface normal distribution determining unit 105 performs a form data outputting process for outputting form data corresponding to the surface normal distribution calculated in Step S906.

In Step S909, the print data generating apparatus 11 determines whether or not the pixels of all the BRDF models in the BRDF model group obtained in Step S901 have been processed. The print data generating apparatus 11 returns to Step S903 if determining that not all the BRDF models have been processed. The print data generating apparatus 11 ends the series of processes if determining that all the BRDF models have been processed.

As has been described above, in the print data generating apparatus in this embodiment, BRDF models which are dependent on the light vector and the observing vector are inputted and print data for reproducing the object to be reproduced is generated. In so doing, the data of the light source vector is obtained and used in the process for generating a simulated form. Thus, accurate print reproduction is possible. The accurate print reproduction means that it is possible to accurately reproduce how light is emitted outward in various directions upon incidence of light onto a given point on the print surface. Thus, in this embodiment, by obtaining in particular the direction of incident light in the print viewing environment as described above, it is possible to accurately reproduce the distribution of reflected light on the object while greatly reducing the number of dimensions to be calculated.

Embodiment 2

In the calculation of the surface normal distribution in Step S906 in Embodiment 1, the surface normal distribution of the print object is determined in conformity with the target reflectance distribution of the object to be reproduced. However, this embodiment is not limited to such a case. In the case of generating concavities and convexities on the surface as described in Embodiment 1, a shadow (a surface which the light from the light source cannot reach) may possibly be formed by the concavo-concave form which is dependent on the angle of the light source vector. In Embodiment 1, the light source is fixed, which in some cases leads to a situation where the reflection distribution is absent in the region where the shadow is formed and neither the color data nor the form data can therefore be obtained therefrom.

Figure 10:
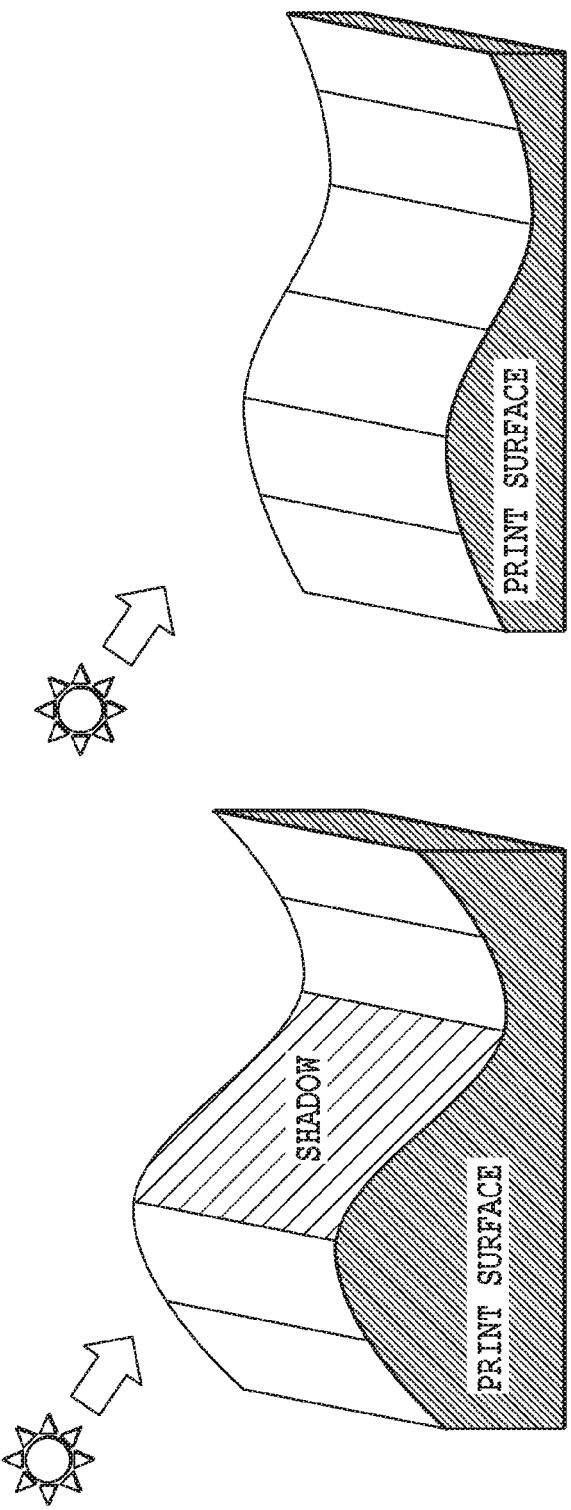
FIG. 10A is a diagram showing one example of shadow information calculation in Embodiment 2.
FIG. 10B is a diagram showing one example of shadow information calculation in Embodiment 2.

Description will be given below using FIGS. 10A and 10B. FIG. 10A is a diagram showing an example of the case where a region shaded by the roughness form of the print surface is formed. In this case, no light reflection occurs in the directions normal to the shadow region, and the BRDF distribution in these normal directions cannot therefore be reproduced. In contrast, in a case where the concavities and convexities on the print surface are not large as in FIG. 10B, the light is incident on the entire surface, and the reflectance distribution can therefore be reproduced on all the normal surfaces.

With this taken into consideration, in this embodiment, it is determined whether or not there is a shadow region like the one formed in FIG. 10A by using the light source vector, obtained by an incident light angle obtaining unit 102, and the form data may be corrected in a case where a shadow region is formed. In other words, the form of and around the shadow region is corrected such that the light from the light source will be incident on the shadow region in FIG. 10A as shown in FIG. 10B and no shadow region will therefore be formed. Specifically, a convex portion in the shadow region toward the direction of the light source vector is corrected such that the light from the light source will be incident on the shadow region. Alternatively, a concave portion appearing in the shadow region may be corrected such that the light from the light source will be incident on the shadow region.

Figure 11:
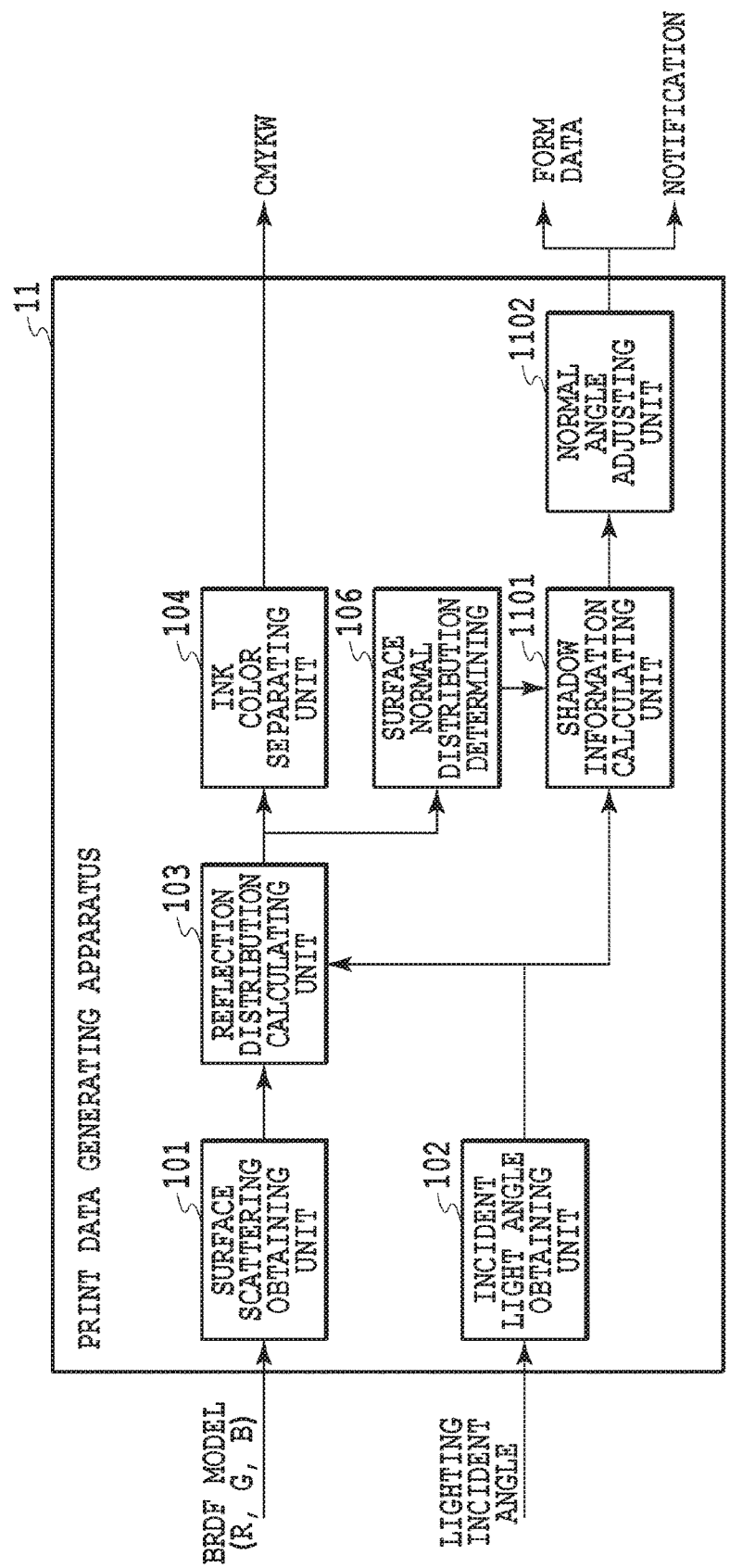
FIG. 11 is a diagram showing one example of the configuration of a print data generating apparatus in Embodiment 2.

FIG. 11 is a diagram showing an example of the configuration of a print data generating apparatus 11 in Embodiment 2. In FIG. 11, processing units configured to operate similarly to those in the configuration in FIG. 1 are denoted by the same reference numerals. Here, the print data generating apparatus shown in FIG. 11 further includes a shadow information calculating unit 1101 and a normal angle adjusting unit 1102 in addition to the configuration in Embodiment 1.

The shadow information calculating unit 1101 is configured to calculate a section where a shadow region as shown in FIG. 10A is formed, by using the form (surface normal distribution) data outputted from the surface normal distribution determining unit 105 and the light source vector obtained by the incident light angle obtaining unit 102. The shadow information calculating unit 1101 calculates the shadow region, for example, after the form data on the entire BRDF model group is outputted from the surface normal distribution determining unit 105. In this embodiment, the light source vector has been obtained by the incident light angle obtaining unit 102, that is, the light angle is already known. Here, in a case where the normal vector to a given surface (⅕×5 of the pixel of the BRDF model) is already determined and the incident light is incident on that surface, the incidence is limited to a range of zenith angles of 0 degree to 90 degree on the surface. In a case where the light source vector is already known, it is possible to determine whether or not the incident light is incident on the surface of interest, that is, whether or not a shadow region is present on the surface of interest, by calculating the angle to the normal vector to this surface. Moreover, if it is determined that a shadow region is present, it is possible to specify the shadow region by considering a line extended from the end of the surface in parallel to the light source vector.

The normal angle adjusting unit 1102 corrects the form (surface normal distribution) data on the region determined as a shadow region by the shadow information calculating unit 1101 such that the angles of the normals thereto will be low, with the assumption that an angle perpendicular to the horizontal plane is 0°. Alternatively, the form data on the region that causes the formation of the shadow region may be corrected.

Note that a shadow is likely to be formed by a concavity and a convexity on the surface particularly in a case where the normal vector has a large angle of near 90°. Such a case leads to a situation where the target reflectance distribution cannot be achieved via the surface normal control, that is, the angles of the normals cannot be adjusted in such a way as to prevent the formation of a shadow region even with the form data correction. In such a situation, the user is notified that the inputted data cannot be reproduced, for example, by displaying such information on a display not shown in particular. In this case, the user may be prompted to reduce the angle of the light source vector.

In the correction of the surface normal distribution data performed here, the adjustment only needs to be such that the normal vector will not be at 90° or larger with respect to the light source vector. In so doing, a calculation similar to that by the surface normal distribution determining unit only needs to be performed while satisfying the above constraint.

Meanwhile, in a shadow region, the light is not incident, and no reflection component is thus present therefor in the reflection distribution data outputted from the reflection distribution calculating unit 103, and no ink color separation is thus performed therefor by the ink color separating unit 104. In the case where the form data is corrected to thereby prevent the formation of the shadow region, the ink amount data is derived for the region which was the shadow region. The BRDF model corresponding to the region with the corrected form can be obtained using the surface scattering data obtained by the surface scattering obtaining unit 101. Since the light source vector has been obtained by the incident light angle obtaining unit 102, the reflection component in the state where the light source vector on the region which was the shadow region is known can be calculated. As described in Embodiment 1, the ink color separating unit 104 derives and outputs the ink amount data corresponding to this reflection component. Thus, the ink amount data can be derived also for the region which was the shadow region.

As has been described above, according to this embodiment, it is possible to accurately reproduce how light is emitted outward in various directions even for a shadow region formed in the case where the light source vector is fixed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-256080, filed Dec. 18, 2014, which is hereby incorporated by reference herein in its entirety.

The invention claimed is:

1. A print data generating apparatus, comprising:
an obtaining unit configured to obtain a BRDF model group for each of a plurality of colors and an angle of incident light in an environment where an object to be reproduced is to be viewed;
a calculating unit configured to calculate a reflection distribution of the object to be reproduced for which the angle of the incident light is limited by applying the angle of the incident light, obtained by the obtaining unit, to each of models in the BRDF model group;
a color data outputting unit configured to output color data for each of the models in the BRDF model group based on the reflection distribution calculated by the calculating unit, the color data indicating a color to be formed on a surface of the object to be reproduced; and
a form data outputting unit configured to output form data for each of the models in the BRDF model group based on the reflection distribution calculated by the calculating unit, the form data indicating a form of the object to be reproduced.

2. The print data generating apparatus according to claim 1, wherein the form data outputting unit outputs the form data on the processing target model based further on a reflection distribution corresponding to the color data on the processing target model outputted from the color data outputting unit.

3. The print data generating apparatus according to claim 2, wherein the form data outputting unit outputs the form data based on a ratio between the reflection distribution of the processing target model calculated by the calculating unit and the reflection distribution corresponding to the color data on the processing target model.

4. The print data generating apparatus according to claim 3, wherein the reflection distributions used in the ratio indicate of spreads of anisotropic specular components.

5. The print data generating apparatus according to claim 4, wherein the form data outputting unit outputs form data corresponding to a form model by referring to a form table in which values of the ratio and form models are associated with each other.

6. The print data generating apparatus according to claim 5, wherein the form data outputting unit outputs form data obtained as a result of rotating the form model by a rotation angle given to the processing target model.

7. The print data generating apparatus according to claim 1, wherein the form data outputting unit outputs, as the form data, a surface normal distribution of each surface obtained by dividing the processing target model.

8. The print data generating apparatus according to claim 1, wherein the color data outputting unit derives color data corresponding to a diffuse component and a specular intensity component indicated by the reflection distribution calculated by the calculating unit, by using a color table in which a plurality of pieces of color data are associated with diffuse components and specular intensity components.

9. The print data generating apparatus according to claim 8, wherein
in the color table, the plurality of pieces of color data are further associated with corresponding anisotropic specular spread components, and
the color data outputting unit outputs, to the form data outputting unit,
the anisotropic specular spread components corresponding to the color data on the processing target model.

10. The print data generating apparatus according to claim 1, further comprising:
a determining unit configured to determine whether a shadow region is formed, based on the form data outputted by the form data outputting unit and the angle of the incident light obtained by the obtaining unit; and
a correcting unit configured to correct the form data in a case where the shadow region is determined to be formed.

11. The print data generating apparatus according to claim 10, wherein the color data outputting unit further outputs color data on a section where the shadow region is determined to be formed, the color data being data after correction of the form in the section.

12. The print data generating apparatus according to claim 10, wherein the correcting unit corrects a gradient of a surface normal which is the form data in accordance with the angle of the incident light.

13. The print data generating apparatus according to claim 10, further comprising a notifying unit configured to notify a user of at least one of a fact that reproduction of the object to be reproduced is impossible and an angle of incident light which enables reproduction of the object to be reproduced, in a case where a shadow region is formed even after the correction by the correcting unit.

14. A print data generating method, comprising:
an obtaining step of obtaining a BRDF model group for each of a plurality of colors and an angle of incident light in an environment where an object to be reproduced is to be viewed;
a calculating step of calculating a reflection distribution of the object to be reproduced for which the angle of the incident light is limited by applying the angle of the incident light, obtained in the obtaining step, to each of models in the BRDF model group;
a color data outputting step of outputting color data for each of the models in the BRDF model group based on the reflection distribution calculated in the calculating step, the color data indicating a color to be formed on a surface of the object to be reproduced; and a form data outputting step of outputting form data for each of the models in the BRDF model group based on the reflection distribution calculated in the calculating step, the form data indicating a form of the object to be reproduced.

15. A non-transitory computer readable storage medium storing a program which causes a computer to perform a print data generating method, the method comprising:

an obtaining step of obtaining a BRDF model group for each of a plurality of colors and an angle of incident light in an environment where an object to be reproduced is to be viewed;

a calculating step of calculating a reflection distribution of the object to be reproduced for which the angle of the incident light is limited by applying the angle of the incident light, obtained in the obtaining step, to each of models in the BRDF model group;

a color data outputting step of outputting color data for each of the models in the BRDF model group based on the reflection distribution calculated in the calculating step, the color data indicating a color to be formed on a surface of the object to be reproduced; and a form data outputting step of outputting form data for each of the models in the BRDF model group based on the reflection distribution calculated in the calculating step, the form data indicating a form of the object to be reproduced.

* * * * *